Figure 1:
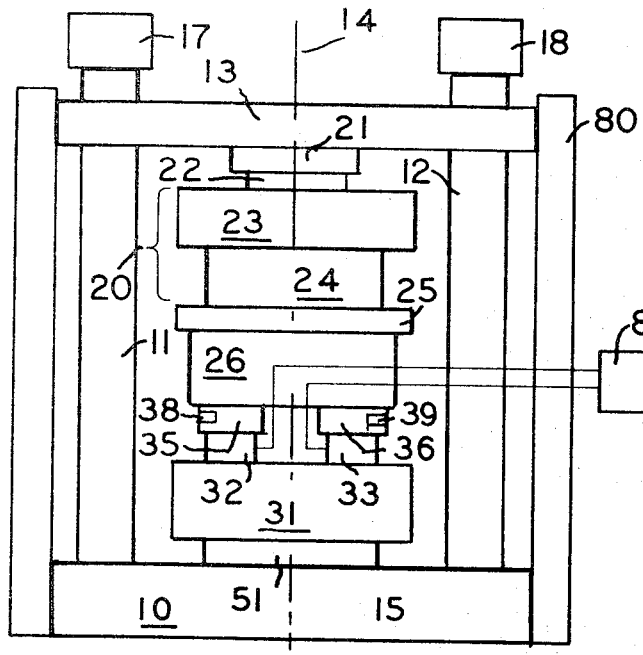

United States Patent
Key, Jr. et al.

[11] 3,842,662
[45] Oct. 22, 1974

[54] PRESSURE RELEASE TEST DEVICE
[75] Inventors: Carroll L. Key, Jr., State College; Walter C. Leschek, Pittsburgh, both of Pa.
[73] Assignee: The United States of America as represented by the Secretary of the Navy, Washington, D.C.
[22] Filed: Aug. 14, 1972
[21] Appl. No.: 280,609

[52] U.S. Cl. .................................................. 73/67.1
[51] Int. Cl. .......................................... G01n 29/00
[58] Field of Search ......... 73/67.1, 67.2, 67.3, 67.4, 73/71.5 R

[56] References Cited
UNITED STATES PATENTS
3,030,803  4/1962  Painter .............................. 73/67.1
3,222,919  12/1965  Shoor et al. ..................... 73/71.5 X
3,416,363  12/1968  Siems ................................. 73/67.1

FOREIGN PATENTS OR APPLICATIONS
316,407  8/1929  Great Britain ...................... 73/67.1
1,019,378  2/1966  Great Britain ...................... 73/67.3

*Primary Examiner*—Charles A. Ruehl
*Attorney, Agent, or Firm*—Richard S. Sciascia; R. J. Miller

[57] ABSTRACT

The invention disclosed herein relates to a test apparatus for evaluating pressure release material having a unique configuration for creating high pressure conditions and includes uniquely mounted piezoceramic elements in conjunction with a hydraulic system for generating both pressure and acceleration in the sample.

7 Claims, 4 Drawing Figures

PRESSURE RELEASE TEST DEVICE

The invention described herein may be manufactured and used by or for the Government of the United States of America for governmental purposes without the payment of any royalties thereon or therefor.

Pressure release material and mechanical filter arrangements are evaluated by measuring their transmissibility when terminated by a standard load mass, as a function of frequency, pressure, and temperature. Transmissibility is defined as the ratio of the load-mass acceleration to the acceleration of the shaker head with the test structure inserted between the shaker head and load mass. Good pressure release or filter structures would be those having low, pressure-and-temperature invariant, transmissibility in the frequency band of interest.

It is therefore an object of this invention to provide an improved piece of test equipment for measuring transmissibility of a pressure release material.

It is a further object of this invention to provide an improved test device for measuring pressure release material by evaluating their transmissibility when terminated by a standard load mass.

It is yet a further object of this invention to provide an improved test device for measuring transmissibility comprising; a pressure head for applying pressure to a pressure release sample, a low pass compression fixture adapted to be driven by said pressure head, a standard load mass positioned to be driven by said low pass compression fixture, a force generator designed to produce different loads and forces within said pressure release sample positioned on said pressure head device, and a pressure release sample positioned between the said force generator and said standard load mass to receive the pressure and force for test purposes.

Still a further object of this invention is to provide an improved test stand for applying acceleration and pressure forces to a pressure release sample comprising; means, including a pressure head and a base for applying a pressure force along an axis in a given direction, a low pass compression filter driveable along the axis by the pressure head, a standard load mass driven by the low pass compression filter, and a piezoceramic shaker mounted on the base and positionable along the axis to hold a pressure release sample between the mass and the shaker so that pressure and acceleration forces are applied to the sample.

Figure 3:
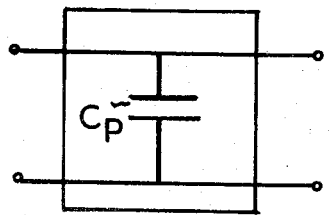
Figure 4:
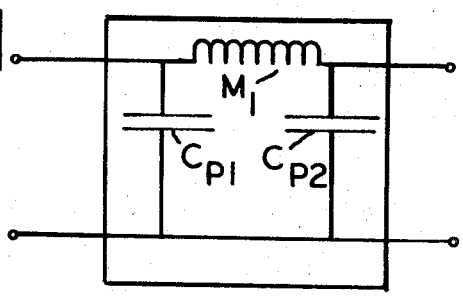
Figure 2:
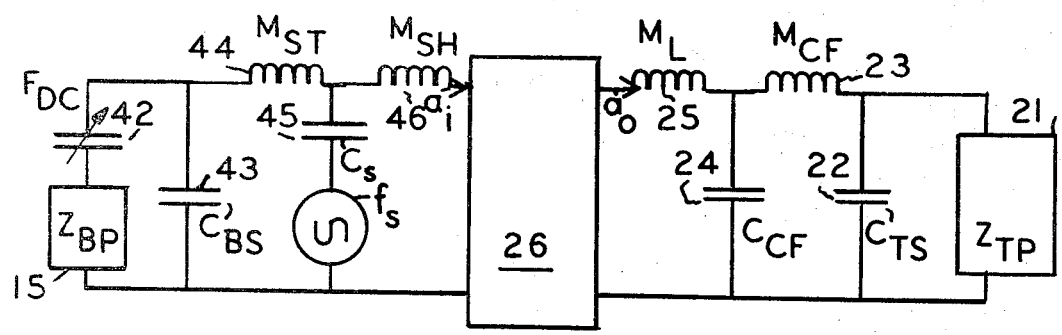

Other objects, advantages and novel features of the invention will become apparent from the following detailed description of the invention when considered in conjunction with the accompanying drawing wherein:

FIG. 1 shows one embodiment of the invention.
FIG. 2 shows a lumped element equivalent circuit of the device in FIG. 1.
FIG. 3 shows a simple spring.
FIG. 4 shows a compliance-mass-compliance network.

In FIG. 1, a test bed 10 comprises a bottom plate 15 and a pair of hydraulic driving means 11, 12 coupled to source of power 17, 18 adapted to bring a top plate 13, in a downward or vertical direction along an axis 14 thereby developing pressure on a sample to be tested. A low pass compression fixture 20 is driven by a ball-and-socket coupling element 21, and spring 22 in a downward direction and comprises a mass 23 and a spring of syntactic foam 24. Syntactic foams are low-density materials made by mixing hollow spheres into thermosetting binders such as urethanes, epoxies, and polyesters.

Spring 24 drives a standard load mass 25 that in turn drives a pressure release sample 26. A force generator comprises a tungsten base element 31 for piezoceramic elements 32, 33. In the embodiment shown there are four piezoceramic elements, the other two are not shown in FIG. 1 but are positioned behind 32, 33 such that the four elements would be distributed substantially uniformly about axis 14 running thru tungsten base element 31. A box 81 designates the necessary electrical circuitry coupled to the piezoceramic elements 32, 33 to drive them in a predetermined variable phase relationship. Two magnesium heads, 35 and 36 are mounted between the sample 26 and the four piezoceramic elements. Each of the magnesium heads contain a built in accelerometer 38, 39 located within the magnesium head elements.

FIG. 2 the equivalent circuit of the test setup includes the test bed bottom plate 15 whose impedance is shown as $Z_{BP}$, and the DC force as a variable voltage source 42 of magnitude $F_{DC}$.

Capacitor 43 is the spring 51 of FIG. 1 made of syntactic foam and has a symbol for electrical purposes as $C_{BS}$. An inductance 44 is $M_{ST}$ the mass 31 of FIG. 1 and in conjunction with 43, forms a low pass filter.

The force generator is in series with a capacitor 45 representing a lumped impedance $C_S$ of the piezoceramic elements 32 and 33. A second inductance 46 represents the mass $M_{SH}$ of magnesium head elements 35, 36. The test structure or the sample to be tested 26 is shown receiving an input acceleration $a_i$.

Acceleration $a_o$, leaves test structure and enters the load mass 25 represented as inductance $M_L$. This acceleration is fed thru a low pass filter composed of a syntactic foam complient spring $C_{CF}$ or 24 and tungsten mass 23 or $M_{CF}$. The low pass filter as shown feeds to a spring 22 and ball-and-socket coupling element 21 whose impedance is shown as $Z_{TP}$.

FIG. 2 shows a simplified lumped element equivalent circuit of the test set-up. The piezoelectric shaker consists of a voltage-actuated force generator 30, the compliance impedance of the piezoceramic elements $C_S$, the tungsten base $M_{ST}$ and the magnesium head mass $M_{SH}$. The bottom plate of the hydraulic press is represented by its mechanical input impedance $Z_{BP}$. The piezoelectric shaker is not placed directly on top of the press bottom plate because this would produce undesirable vibration couplings from the shaker to the press. Instead, a ring-like spring 51 made of syntactic foam is placed between the shaker base and the press bottom plate. This spring is represented by the compliance $C_{BS}$. The compliance $C_{BS}$ acting in conjunction with the shaker base mass $M_{ST}$ forms a low-pass filter, permitting the transmission of static compressive forces but rejecting the transmission of any dynamic motion.

The DC force $F_{DC}$ represents the variable compressive force that can be applied to the test structure to simulate pressures that would be encountered at various ocean depths. It should be noted that this DC compressive force is applied directly and unattenuated to the test structure because the mass elements have no reactance at zero frequency.

Two basic types of test structures are used. The first is just a single pressure-release pad. This is represented as a simple spring having compliance $C_P$ as shown in FIG. 3. The second test structure is a little more complicated and consists of two pressure-release samples with a high-mass-reactance element sandwiched between them. This structure is represented by the compliance-mass-compliance $\pi$ network shown in FIG. 4.

The load mass is designed so that it has negligible compression and thereby acts as a pure lumped-mass element $M_L$.

The low-pass compression fixture is made of a heavy mass $M_{CF}$ and a relatively compliant spring $C_{CF}$ made of a large hollow block of syntactic foam. The top press plate ball-and-socket coupling element is represented by its mechanical input impedance $Z_{TP}$. The compression fixture is joined to the top press plate ball-and-socket coupling element by a ring-like syntactic foam spring $C_{TS}$, in the same manner as the shaker base is joined to the bottom of the press. The $\pi$ network composed of $C_{CF}$ —$M_{CF}$ —$C_{TS}$ forms a very good low-pass filter permitting the DC compressive force to be transmitted and blocking high-frequency dynamic motion. The compliance $C_{CF}$ has such a low impedance at the frequencies of interest that the test structure is effectively loaded only by the mass reactance of the element $M_L$.

Measurements have shown that above 2.0 kHz the low-pass filters formed by $M_{ST}$ —$C_{BS}$ and $C_{CF}$ —$M_{CF}$ —$C_{TS}$ perform so well that the dynamic system of interest can be effectively represented by the equivalent circuit shown in FIG. 2.

Accelerometers are mounted within the shaker head $M_{SH}$, and on the load mass $M_L$, to monitor the accelerations $a_i$ of the head and $a_o$ of the load. The self-contained shaker head accelerometer permits the shaker head to be driven at a constant acceleration independent of the test structure input impedance—one just has to adjust the driving force $f_s$ until the desired magnitude of $a_i$ is arrived at. This is even possible if the test structure input impedance should form a resonant loop with the shaker head $M_{SH}$, and compliance $C_S$. Effectively the test structure is always driven from a "constant current source", in this case an acceleration of magnitude $a_i$.

For temperature tests and control an insulating jacket 80 can be placed around the test stand of FIG. 1.

Obviously many modifications and variations of the present invention are possible in the light of the above teachings. It is therefore to be understood that within the scope of the appended claims the invention may be practiced otherwise than as specifically described.

We claim:

1. An improved test stand for applying acceleration and pressure forces to a pressure release sample comprising:
    a. means, including a pressure head and a base for applying a pressure force along an axis in a given direction;
    b. a low pass compression filter driveable along said axis by said pressure head;
    c. a standard load mass driven along said axis by said low pass compression filter; and
    d. a piezoelectric shaker mounted on said base and positionable along said axis to hold a pressure release sample between said mass and said shaker so that pressure and acceleration forces are applied to said sample.

2. The improved stand of claim 1 wherein said low-pass compression filter includes a compliant syntactic foam spring.

3. The improved stand of claim 1 wherein said shaker includes four piezoceramic elements for generating acceleration forces along said axis.

4. The improved stand of claim 3 wherein each pair of piezoceramic elements has mounted thereon a magnesium head element positioned such that said piezoceramic elements drive said heads against said pressure release sample.

5. The improved stand of claim 4 wherein an accelerometer for measuring the forces applied to said sample is mounted on each magnesium head element.

6. The improved stand of claim 5 wherein there is provided a circuit for driving said piezoceramic element in a predetermined, variable phase relationship.

7. The improved stand of claim 6 wherein there is provided an insulating jacket about said stand for controlled temperature testing.

* * * * *